United States Patent
Hiji et al.

(10) Patent No.: US 6,580,482 B1
(45) Date of Patent: Jun. 17, 2003

(54) MULTI-COLOR DISPLAY DEVICE

(75) Inventors: Naoki Hiji, Nakai-machi (JP); Shigeru Yamamoto, Nakai-machi (JP); Takehito Hikichi, Nakai-machi (JP); Teiichi Suzuki, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/436,227

(22) Filed: Nov. 9, 1999

(30) Foreign Application Priority Data

Nov. 11, 1998 (JP) .......................................... 10-321108

(51) Int. Cl.⁷ ............................................. G02F 1/1336
(52) U.S. Cl. ......................................... 349/115; 349/74
(58) Field of Search ................................ 349/106, 115, 349/74

(56) References Cited

U.S. PATENT DOCUMENTS 5,619,355 A * 4/1997 Sharp et al. ................... 349/78
6,433,843 B1 * 8/2002 Okada et al. .................. 349/78

FOREIGN PATENT DOCUMENTS

| JP | 7-287214 | 10/1995 |
| JP | 8-304848 | 11/1996 |
| JP | 10-142593 | 5/1998 |

* cited by examiner

Primary Examiner—James Dudek
(74) Attorney, Agent, or Firm—Oliff & Berridge, PLC

(57) ABSTRACT

A reflective-type multi-color display device is capable of obtaining a vivid and bright multi-color display with less display layers, and therefore, with a state where a parallax is decreased and a cost of the device can be reduced. Specifically, the display device of the present invention includes a cell 51 having a display layer 31 comprising a right-handed cholesteric liquid crystal which selects and reflects blue, a cell 53 having a display layer 33 comprising a left-handed cholesteric liquid crystal which selects and reflects green, a cell 57 having a display layer 37 comprising a right-handed cholesteric liquid crystal which selects and reflects yellow and a cell 55 having a display layer 35 comprising a left-handed cholesteric liquid crystal which selects and reflects red, these layers being laminated in this order from the observation side. A color filter 43 which transmits red and absorbs the other color light is provided between the cell 57 and the cell 55. A black light-absorbing layer 41 is formed at the back side of the cell 55.

10 Claims, 11 Drawing Sheets

FIG. 14
|  | EXAMPLE 1 | EXAMPLE 2 | EXAMPLE 3 | EXAMPLE 4 | COMPARISON EXAMPLE |
|---|---|---|---|---|---|
| $L^*$ (WHITE) | 78.2 | 65.0 | 77.0 | 64.9 | 57.7 |
| $L^*$ (YELLOW) | 76.9 | 62.4 | 76.4 | 52.7 | 52.7 |
| $c^*$ (YELLOW) | 75.5 | 64.0 | 53.4 | 57.7 | 52.7 |
FIG. 15
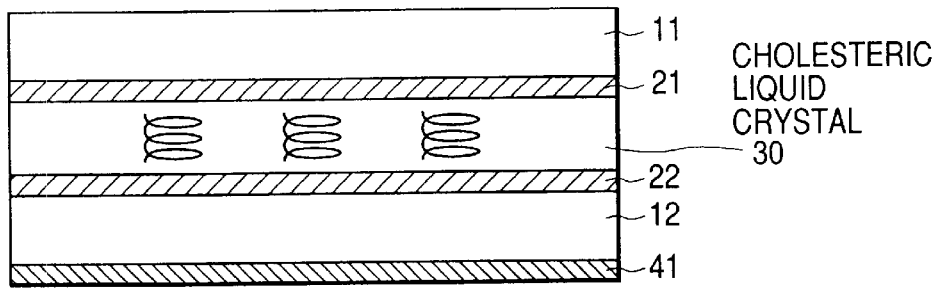
FIG. 16A
PLANAR
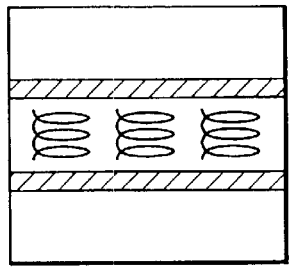
FIG. 16B
FOCAL CONIC
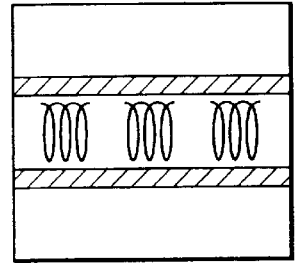
FIG. 16C
HOMEOTROPIC
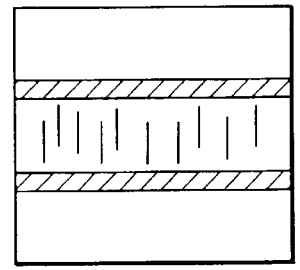

MULTI-COLOR DISPLAY DEVICE

BACKGROUND OF THE INVENTION

1. Field of the Invention

The present invention relates to a multi-color display device used as a display panel of an electric apparatus.

2. Description of the Related Art

A transmission type liquid display device has widely been used as a flat panel display device, in which a liquid crystal element is formed to serve as an optical shutter for transmitting or intercepting an illumination light from a backlight arranged at the back side thereof to perform displaying. However, a transmission type liquid crystal device has a problem of using a great amount of consumptive electric power, being hard to see the display under a strong external light such as outdoors light.

In order to solve this problem, a reflective type liquid crystal device has been drawing attention which performs displaying utilizing reflection of an external light not utilizing the backlight. A cholesteric liquid crystal device has been known as one of a type thereof.

The cholesteric liquid crystal contains a rod like molecule and has a multi-layer formation. The molecular major axis is oriented in one direction in one layer, but its orientation direction is slightly twisted between the adjacent layers, to thereby form a helical structure as a whole. The period of the helix can be made to an optical wavelength order by depending upon a suitable selection of a material. In this case, the cholesteric liquid crystal selectively reflects a visible light. This phenomenon is known as selective reflection of the cholesteric liquid crystal.

The display device utilizing the selective reflection of the cholesteric liquid crystal has been known as a kind of the reflective-type display device. As shown in FIG. 15, this cholesteric liquid crystal display device has two transparent substrates 11 and 12 each provided with a transparent electrode 21 and 22, between which a cholesteric liquid crystal 30 is injected to form a liquid crystal cell. Further, a black light-absorbing layer 41 is mounted at the backside of the substrate 12 that is opposite to the observation side (the side from which the external light is incident).

There are three kinds of the orientation state of the cholesteric liquid crystal 30 in the cell, i.e., a planar orientation shown in FIG. 16A, a focal conic orientation in FIG. 16B and a homeotropic orientation in FIG. 16C. The planar orientation has a state in which the helical axis is oriented in approximately perpendicular to the substrate, whereby a light of a color in the wave band of a selective reflection is observed. The focal conic orientation has a state in which the helical axis is approximately parallel to the substrate, whereby the liquid crystal itself is achromatic but the light-absorbing layer 41 is observed, so that black appearance is obtained. The homeotropic orientation has a state in which the molecule of the liquid crystal is oriented in perpendicular to the substrate by disarranging the helical structure. Therefore, the liquid crystal itself is achromatic, so that the light-absorbing layer 41 is observed for obtaining black appearance.

A change-over of the above-mentioned orientation states can be electrically performed. Specifically, when a voltage is applied to the portion between the electrodes 21 and 22 in the planar orientation state, the state is changed into the focal conic orientation. The state is further changed into the homeotropic orientation upon increasing the voltage. Conversely, when the voltage is slowly reduced from the homeotropic orientation state, the focal conic orientation is attained, while the planar orientation is not obtained even if the voltage becomes zero. When the voltage is rapidly decreased from the homeotropic orientation state, the state becomes not the focal conic orientation but the planar orientation.

Accordingly, the cholesteric liquid crystal can be used as a display device by performing an electrical change-over between the planar orientation and the focal conic orientation or between the planar orientation and the homeotropic orientation. Further, in the cholesteric liquid crystal, both of the focal conic orientation state and the planar orientation state stably exist when the voltage is not applied, whereby display of memory utilizing its characteristics is possible.

Additionally, the orientation state can thermally be changed over. For example, the focal conic orientation is obtained when the cholesteric liquid crystal is once heated to a temperature of an isotropic phase and then cooled down until the liquid crystal phase is obtained. The use of this phenomenon is made possible to perform the change-over between the focal conic orientation and the planar orientation by both utilizing heat and electricity. It has been known that the orientation state can be changed over in response to the external stimulus such as a magnetic force, light, stress or the like, not being limited to an electricity and heat.

The orientation state of the cholesteric liquid crystal is greatly influenced with the interface which is in contact with the cholesteric liquid crystal. Therefore, a method has been known for improving the optical characteristics, electric characteristics, stability or the like of each orientation state by forming an orientation film between the cholesteric liquid crystal layer and the electrode or by dispersing a macromolecular material in the cholesteric liquid crystal.

As for such a multi-color display device using the cholesteric liquid crystal, the one for performing multi-color displaying disclosed in Japanese Unexamined Patent Publication No. Hei 8-304848, for example, is provided in which three cholesteric liquid crystal layers each selecting and reflecting blue, green and red respectively are laminated with one another and multi-color displaying is performed by an additive process of each layer.

FIG. 17 shows this conventional cholesteric liquid crystal multi-color display device. A blue cell 51 is formed such that a display layer 31 containing a cholesteric liquid crystal which reflects blue colored light is mounted between two transparent substrates 11 and 12 each provided with a transparent electrode 21 and 22, while a green cell 53 is formed such that a display layer 33 containing a cholesteric liquid crystal which reflects green colored light is mounted between two transparent substrates 13 and 14 each provided with a transparent electrode 23 and 24. Further, a red cell 55 is formed such that a display layer 35 containing a cholesteric liquid crystal which reflects red colored light is mounted between two transparent substrates 15 and 16 each provided with a transparent electrode 25 and 26. A black light-absorbing layer 41 is formed at the back side of the cell which is most remote from the observation side, for example, the red cell 55.

The blue, green and red mean herein a color light belonging to a wave band of 400 to 500 nm, 500 to 600 nm and 600 to 700 nm respectively. Concretely, the blue, green or red display can be obtained by bringing one of the blue display layer 31, green display layer 33 and red display layer 35 into the selective reflection state and bringing the other two layers into the achromatic state. Moreover, the cyan, magenta or yellow display can be obtained by bringing two of the blue display layer 31, green display layer 33 and red display layer 35 into the selective reflection state and bringing the other one layer in the achromatic state. Further, the white display can be obtained by bringing all of the blue display layer 31, green display layer 33 and red display layer 35 in the selective reflection state, while the black display can be obtained by bringing all of the blue display layer 31, green display layer 33 and red display layer 35 into the achromatic state.

In this case, the cholesteric liquid crystal having the same helix sense has been used for the cholesteric liquid crystal of each display layer 31, 33 and 35. The reason is as follows. The general method for manufacturing the cholesteric liquid crystal is the one in which an asymmetric carbon compound called a chiral agent is mixed with a nematic liquid crystal composition. In view of this, the cholesteric liquid crystal having the same helix sense and different selective reflection wave band can easily be manufactured by changing the mixing ratio of the chiral agent and the nematic liquid crystal composition.

Instead of forming each display layer 31, 33 and 35 between a pair of electrode respectively for applying individually a driving voltage thereto as shown in FIG. 17, a multi-color display device as shown in FIG. 18 has been considered in which all display layers 31, 33 and 35 may be laminated to be formed between a pair of transparent electrodes 21 and 26 each provided at the transparent substrates 11 and 16 and then the difference with respect to these electrolytic response, i.e., the difference in the threshold electric field of the change in the orientation state, the difference in the positive or negative of the anisotropy of the permittivity or the like may be utilized for switching each display layer 31, 33 and 35 between the selective reflection state and the achromatic state.

The selective reflection of the cholesteric liquid crystal occurs attributed to the helical structure, to thereby show remarkable circular dichroism depending on the helix sense. Specifically, the left-handed cholesteric liquid crystal reflects a left-handed circularly polarized light while it transmits right-handed circularly polarized light. Conversely, the right-handed cholesteric liquid crystal reflects a right-handed circularly polarized light while it transmits left-handed circularly polarized light. Therefore, the reflectance of only 50% to the maximum can be obtained under generally non-polarized illumination such as sunlight, incandescent light, fluorescent light or the like, thereby entailing a problem of insufficient reflectance. Particularly, in the case where multi-color display is performed by laminating with one another a plurality of cholesteric liquid crystal display layers each having a different display color (selective reflection color) as shown in FIGS. 17 and 18, chroma or brightness is insufficient to thereby entail a problem that a vivid, bright display cannot be obtained.

In order to solve this problem, a method has been known in which two cholesteric liquid crystal layers each having a different helix sense are laminated with each other. Further, Japanese Unexamined Patent Application No. Hei 7-287214 discloses that a PDCLC layer (macromolecular dispersing cholesteric liquid crystal layer) obtained by dispersing a right-handed cholesteric liquid crystal in a polymer and a PDCLC layer obtained by dispersing a left-handed cholesteric liquid crystal in a polymer are laminated with each other. Moreover, Japanese Unexamined Patent Application No. Hei 10-142593 discloses that the same effect can be obtained by providing between two cholesteric liquid crystal layers having the same helix sense a retardation layer which reversely changes a circularly polarized light, instead of laminating with each other two cholesteric liquid crystal layers each having a different helix sense.

The reflectance is improved in either case since the component of the circularly polarized light that is not reflected by the first cholesteric liquid crystal layer is reflected by the second cholesteric liquid crystal layer. Specifically, a double reflectance to the maximum can be obtained compared with the case using a single cholesteric liquid crystal layer, since the reflectance is the sum of the reflectance of each cholesteric liquid crystal layer. For performing multi-color displaying, each of the blue, green and red display layers may be constructed by laminating with each other two cholesteric liquid crystal layers each having a different helix sense as disclosed in Japanese Unexamined Patent Application No. Hei 7-287214.

The above-mentioned Japanese Unexamined Patent Application No. Hei 10-142593 discloses that, in a single-color display device using a cholesteric liquid crystal, whitish display with high reflectance can be obtained by laminating two cholesteric liquid crystal layers each having a different helix sense as well as each having a different center wavelength of the selective reflection within the range of 30 to 100 nm.

However, in the case where each of the blue, green and red display layers is formed by laminating two cholesteric liquid crystal layers each having a different helix sense as described above, six cholesteric liquid crystal display layers in total should be laminated, resulting in entailing a problem of increasing a parallax that means an image appears blurred in the case of viewing diagonally as well as a problem of increasing a cost due to a complicated structure of the display device.

SUMMARY OF THE INVENTION

The present invention provides a multi-color display device using a cholesteric liquid crystal layer capable of providing a vivid bright display, with less display layers, i.e., with a state where a parallax is reduced and a cost of the device is decreased, by solving a problem of insufficient chroma and brightness attributed to a circular dichroism of the selective reflection of the cholesteric liquid crystal layer.

The present invention further provides, not only a multi-color display device using a cholesteric liquid crystal layer, but also a reflective multi-color display device capable of providing a vivid bright display with less display layers, i.e., with a state where a parallax is reduced and a cost of the device is decreased.

An aspect of the multi-color display device of the present invention has multiple display layers laminated with one another. Each of the display layers contains a cholesteric liquid crystal layer and has a different wave band of a selective reflection. A helix sense of a cholesteric liquid crystal of at least one display layer is different from those of cholesteric liquid crystals of the other display layers.

In another aspect of the multi-color display device, the multiple display layers may be three layers containing each of cholesteric liquid crystal layers reflecting blue, green and red light respectively.

In the other aspect of the multi-color display device, the helix sense of the cholesteric liquid crystal of the green display layer may be different from the helix senses of the cholesteric liquid crystals of the blue and red display layers.

In the other aspect of the multi-color display device, the multiple display layers may also be four layers containing each of cholesteric liquid crystal layers selecting and reflecting blue, green, yellow and red respectively.

In the other aspect of the multi-color display device, the helix senses of the cholesteric liquid crystals of the blue and yellow are the same while they are different from the helix sense of the cholesteric liquid crystals of the green and red display layers.

The other aspect of the multi-color display device of the present invention also has multiple display layers laminated with one another. Each of the display layers contains a cholesteric liquid crystal layer and has a different wave band of a selective reflection. The helix sense of the cholesteric liquid crystals of all the display layers are the same, and a retardation layer for changing reversely a circular deviation is provided between one display layer and the other display layer adjacent to that layer.

In the other aspect of the multi-color display device, the multiple display layers may be three display layers having a first display layer containing a cholesteric liquid crystal which reflects green and a second and third display layers containing cholesteric liquid crystals each selecting and reflecting blue and red or red and blue. The retardation layer is provided between the first display layer and the second display layer.

In the other aspect of the multi-color display device, the multiple display layers may also be four display layers. The first and second display layers contain cholesteric liquid crystals each selecting and reflecting blue and yellow or yellow and blue. The third and fourth display layers contain cholesteric liquid crystals each selecting and reflecting green and red or red and green. The retardation layer is provided between the second display layer and the third display layer.

The other aspect of the multi-color display device has four display layers laminated with one another. The display layers are capable of varying a state for reflecting each of blue, green, yellow and red or an achromatic state depending upon the presence or absence of an external stimulus or degree of it.

In the other aspect of the multi-color display device, the four display layers are laminated in the order of blue, yellow, green and red from the side for observation.

In the other aspect of the multi-color display device, the display layer most remote from the observation side is a display layer reflecting red. A color filter which transmits red and absorbs a light of the other colors is provided between the display layer reflecting red and a display layer close to the observation side by one layer from the display layer reflecting red.

In the other aspect of the multi-color display device, each display layer is provided between a pair of electrodes and a driving voltage is individually applied to every display layer.

In a multi-color display device in which multiple display layers containing a cholesteric liquid crystal each having a different wave band of a selective reflection are laminated with one another, i.e., in a multi-color display device in which cholesteric liquid crystal display layers each selecting and reflecting blue, green and red are laminated with one another, the conventional construction is such that the helix sense of all the cholesteric liquid crystals is made to be the same or each display layer is formed by two cholesteric liquid crystal layers each having a different helix sense. The former case brings a problem of insufficient chroma and brightness, while the latter case brings a problem of increasing a parallax and cost of the device as described above.

However, the influence due to the insufficient reflectance of each display layer is different from each display color in a reflective-type multi-color display device having blue, green and red display layers laminated with one another. Specifically, the display color in this case is classified into eight basic display colors: (1) blue, green and red which are the display colors by a single color; (2) cyan, magenta and yellow which are obtained by an additive process of two colors among blue, green and red; (3) white including all of blue, green and red; and (4) black including none of blue, green and red. The inventors of the present invention has found that the insufficiency of chroma or brightness is not so felt in blue, green and red which are the display colors by a single color, but the insufficiency of chroma or brightness is felt in cyan, magenta and yellow which are obtained by an additive process of two colors of (2) as well as (3), especially in yellow and white.

In view of this, a vivid and bright display is possible without increasing the reflectance of the blue, green and red which are the display colors by a single color, if the device is constructed such that the reflectance increases upon displaying the color obtained by the additive process of two or more colors, especially upon displaying yellow and white.

In the one of the above aspects of the multi-color display device of the present invention, the helix sense of the cholesteric liquid crystal of at least one display layer among multiple display layers containing a cholesteric liquid crystal each having a different wave band of a selective reflection is made to be different from those of the cholesteric liquid crystals of the other display layers as described above. For example, in the case of laminating blue, green and red display layers, the helix sense of the cholesteric liquid crystal of the green display layer is made to be different from those of the cholesteric liquid crystals of the blue and red display layers 3. Specifically, the blue, green and red display layers contain respectively a right-handed, left-handed and right-handed (or left-handed, right-handed and left-handed) cholesteric liquid crystals. It is to be noted that the order of the lamination of blue, green and red display layers does not matter.

The reflectance thereby increases in the wave band where the reflective spectra of blue and green, and green and red overlap with each other, and the peak reflectance reaches 100% to the maximum. Therefore, chroma or brightness is enhanced upon displaying cyan which is a mixing color of blue and green, yellow which is a mixing color of green and red and white which is a mixing color of blue, green and red, to thereby obtain a vivid and bright multi-color display.

The reflectance does not increase upon displaying a single color such as blue, green and red, but it is not a problem since the insufficiency of the chroma and brightness is not felt so much in these single colors.

The aspect of the multi-color display device increases the reflectance upon displaying the mixing color in the multi-color display device using the cholesteric liquid crystal layer, to thereby solve a problem of insufficient chroma and brightness which is attributed to a circular dichroism of the selective reflection of the cholesteric liquid crystal. Further, the reflectance upon displaying a single color is not changed while the number of the cholesteric liquid crystal display layer is the minimum, to thereby be capable of decreasing a parallax as well as reducing a cost of the device.

In the other aspect of the multi-color display device, the helix senses of the cholesteric liquid crystals of all the display layers each containing a cholesteric liquid crystal layer having a different wave band of a selective reflection are the same, and a retardation layer for changing reversely a circularly polarized light is provided between one display layer and the other display layer adjacent to that layer.

For example, the display layers have three display layers, laminated with one another from the observation side or from the side opposite to the observation side, including a first green display layer, a second blue or red display layer and a third red or blue display layer, and the retardation layer is provided between the first green display layer and the second blue or red display layer.

Although the helix senses of the cholesteric liquid crystals of all the display layers are the same, the reflectance thereby increases at the wave band where the reflective spectra of blue and green as well as those of green and red overlaps with each other, like the case in which the helix sense of the cholesteric liquid crystal of the green display layer is different from those of the cholesteric liquid crystals of the blue and red display layers as described above, thereby enhancing chroma or brightness upon displaying yellow that is a mixing color of green and red and upon displaying white that is a mixing color of blue, green and red. Consequently, vivid, bright multi-color display can be obtained.

Further, the number of the cholesteric liquid crystal display layers is rendered to the minimum with the reflectance upon displaying a single color left as it is, whereby a parallax can be decreased as well as a cost of the device can be reduced.

Adapted for the retardation layer is a birefringent material called a ½ wave plate for rendering a phase difference between normal light and abnormal light a ½ wavelength.

In the other aspect of the multi-color display device, four display layers each reflecting blue, green, yellow and red in a color light reflective state are laminated as described above in not only the multi-color display device using a cholesteric liquid crystal but also a reflective-type multi-color display device. Specifically, a display layer reflecting yellow is added.

The blue, green, yellow and red means herein respectively a color light belonging to a wave band of 400 to 500 nm, 500 to 600 nm, 550 to 650 nm and 600 to 700 nm.

The display layer in this case is not limited to the one containing a cholesteric liquid crystal but may be the one which can be switched between the reflective state for reflecting a color light in a specified wave band and the achromatic state in response to the presence or absence or degree of the external stimulus, i.e., may be a polymer dispersed liquid crystal made by holographically induced phase separation. The achromatic state indicates a state not colored. It is not always transparent, but may have a haze. Specifically, the achromatic state indicates the focal conic orientation or homeotropic orientation in case where the display layer contains the cholesteric liquid crystal.

Some of the above aspects of the multi-color display device have an advantage of having only three display layers, but it is a little problematic with respect to the enhancement of the reflectance upon displaying a mixing color. Specifically, the reflectance increases depending upon the overlap of the reflective spectrum. The more the reflective spectrum increases, the higher the reflectance upon displaying the mixing color becomes. On the other hand, the chroma upon displaying the single color can be increased when the overlap of the reflective spectrum is small. Therefore, the problem is that the relationship of the trade-off is established between the enhancement of the reflectance upon displaying the mixing color and the enhancement of the chroma upon displaying the single color.

Specifically, for example, the state in which the reflective spectra of green and red overlap with each other means respectively that the red component is mixed upon displaying green and the green component is mixed upon displaying red, thereby bringing reduction of the chroma. On the other hand, the chroma can be enhanced upon displaying the single color of green and red if the reflective spectra of green and red are caused not to be overlapped with each other, but the reflectance cannot be increased upon displaying yellow which is a mixing color of green and red in this case.

This problem can effectively be solved by one of the above aspects of the multi-color display device. Even in the case where the chroma is enhanced upon displaying the single color of green and red by causing the reflective spectrums of green and red not to be overlapped with each other, the reflectance upon displaying yellow or white that is a mixing color including yellow can be increased by adding the yellow display layer. Consequently, the chroma or brightness is enhanced upon displaying yellow and white.

The reflective peak wavelength of green and red is generally set respectively to 530 to 550 nm and 630 to 650 nm in order to extend a display color area as large as possible in the reflective-type multi-color display device having the display layers of blue, green and red laminated with one another. Accordingly, the wave band of 570 to 600 nm becomes a valley of the reflective spectrum in the case of displaying yellow by a mixing color of blue and red or white by a mixing color to which blue is added. The luminosity is relatively high in this wave band, so that it is a great factor for reducing the chroma or brightness.

On the other hand, the aspect of the multi-color display device to overcome the problem compensates this valley of the reflective spectrum by adding the yellow display layer having the reflective peak wavelength of 570 to 600 nm, to thereby be capable of increase the reflectance upon displaying yellow and white.

The wavelength of the reflective spectrum valley varies between 550 to 650 nm depending upon the peak wavelength, peak reflectance and the spectrum shape of the green and red reflective spectra. Therefore, the peak wavelength of the reflective spectrum of the yellow display layer is required to be suitably set with respect to this change. Accordingly, the display layer named "yellow display layer" may substantially have the appearance of yellowish green or orange. This case is included in the aspect to overcome the problem.

The phenomenon that the valley of the reflective spectrum is positioned in the yellow wave band is seen in not only the multi-color display device using a cholesteric liquid crystal but also the reflective-type multi-color device in general. Accordingly, the aspect to overcome the problem can be adapted to the case where the display layer is a polymer dispersed liquid crystal made by holographically induced phase separation. In this case, the same effect can be obtained as the case where the display layer contains a cholesteric liquid crystal.

According to the aspect of the multi-color display device to overcome the problem, four display layers are enough, so that the parallax is decreased as well as the cost of the device can be reduced compared with the conventional case where the blue, green and red display layers are respectively formed of two cholesteric liquid crystal layers each having a different helix sense, i.e., six cholesteric liquid crystal display layers in total are laminated.

In some of the above aspects, the cholesteric liquid crystal display layers each selecting and reflecting blue, green, yellow and red are laminated with one another, the helix senses of the cholesteric liquid crystals of the blue and yellow display layers are made to be the same and to be different from those of the cholesteric liquid crystals of the green and red display layers. Specifically, the blue, green, yellow and red display layers contain respectively right-handed, left-handed, right-handed and left-handed (or left-handed, right-handed, left-handed and right-handed) cholesteric liquid crystals. The lamination order of blue, green, yellow and red does not matter.

The yellow display is thereby obtained by bringing the green, yellow and red display layers into the selective reflection state. At this time, the reflectance increases at the wave band where the reflective spectra of green and yellow or yellow and red overlap with each other because the helix senses of the cholesteric liquid crystals of the green and yellow display layers are different from each other as well as those of the cholesteric liquid crystals of the yellow and red display layers are different from each other, thereby enhancing brightness and chroma upon displaying yellow. Similarly, brightness upon displaying white is enhanced. In this case, the reflective spectra of green and red are not required to be overlapped, so that the chroma upon displaying green and red can be increased.

The same effect can be obtained in case where the blue and yellow cholesteric liquid crystal display layers are laminated at one side of the retardation layer and the green and red cholesteric liquid crystal display layers are laminated at the other side thereof.

The chroma of red is remarkably deteriorated only when the green component is mixed therewith. Particularly, the reflective spectrum of the cholesteric liquid crystal draws relatively a long foot at the short wavelength side, so that it is difficult to obtain a red display with high chroma even if the overlap with the reflective spectrum of green is made small.

On the other hand, the color filter transmitting a red and absorbing the other color light is provided in another aspect of the present invention between the red display layer which is mounted most remote from the observation side and the display layer close to the observation side by one layer from the red display layer, whereby unnecessary component of short wavelength which is reflected by the red display layer is cut out to enhance the chroma of red.

This color filter has a cut-off wavelength at the vicinity of 600 nm for transmitting the wavelength longer than the cut-off wavelength and absorbing the wavelength shorter than the same. The reflectance of approximately zero in the entire visible wavelength area at or below the cut-off wavelength is ideal. However, the reflective strength of the cholesteric liquid crystal decreases, as it becomes remote from the peak wavelength, resulting in avoiding a remarkable inconvenience on practical use even if the absorption of the wavelength at or below 500 nm is practically weak. Accordingly, the same effect can be obtained by using a color filter of magenta instead of the red color filter.

The enhancement of the chroma according to some of the aspects is effectively shown not only upon displaying red but also upon displaying magenta. Although the chroma or brightness upon displaying cyan, yellow and white is enhanced, the effect of enhancing the chroma cannot be obtained with respect to magenta that is a mixing color of blue and red. These aspects supplement this defect to thereby be capable of enhancing the clearness of the chroma upon displaying an image with a good balance.

According to some other aspects, the driving voltage is individually applied for every display layer, to thereby be capable of reducing the driving voltage.

It is desirable to laminate the layers in the order of blue, yellow, green and red from the side for observation. This is because achromatic white display can be obtained by adding the spectrum at the wave band of yellow to the bluish white by the reflection from the blue layer formed at the top side.

BRIEF EXPLANATION OF THE DRAWINGS

In the following description, the same parts are designated by the same reference numbers throughout the several drawings:

FIG. 14 is a view showing brightness upon displaying white and brightness and chroma upon displaying yellow represented by brightness L* and chroma c* at the chromaticity coordinates L*a*b* in the Examples 1 and 4 and Compared Example;

FIG. 15 is a view showing a typical cholesteric liquid crystal display device;

FIGS. 16A–16C are views for explaining three orientation states of the cholesteric liquid crystal;

PREFERRED EMBODIMENT OF THE INVENTION

First Embodiment

<First Case (in the Case of Three Layers)>

Figure 1:
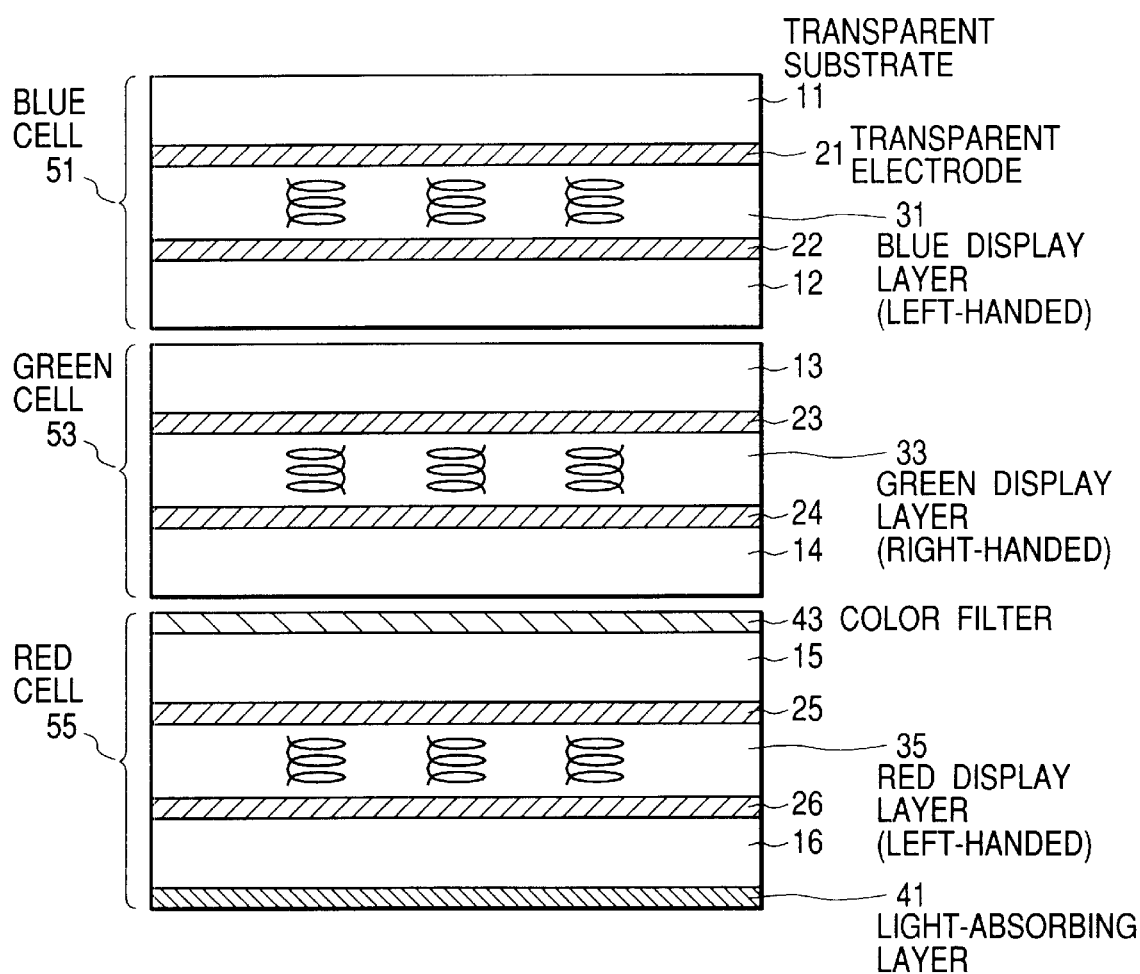
FIG. 1 is a view showing one example of a multi-color display device of the present invention.

FIG. 1 shows a first case of the first embodiment. This first case is one example of the inventions.

In this case, a blue cell 51, a green cell 53 and a red cell 55 are laminated in this order from the side for observation. A color filter 43 described later is provided between the green cell 53 and the red cell 55. Mounted at the back side of the red cell 55 is a black light-absorbing layer 41. The blue cell 51 has two transparent substrates 11 and 12 each provided with transparent electrodes 21 and 22, and a display layer 31 mounted between the transparent electrodes 11 and 12 and containing a left-handed cholesteric liquid crystal which selects and reflects blue, while the green cell 53 has two transparent substrates 13 and 14 each provided with transparent electrodes 23 and 24, and a display layer 33 mounted between the transparent electrodes 13 and 14 and containing a right-handed cholesteric liquid crystal which selects and reflects green. Further, the red cell 55 has two transparent substrates 15 and 16 each provided with transparent electrodes 25 and 26, and a display layer 35 mounted between the transparent electrodes 15 and 16 and containing a left-handed cholesteric liquid crystal which selects and reflects red.

Usable cholesteric liquid crystals of each display layer 31, 33 and 35 are asymmetric carbon compound having mesomorphism such as a cholesterol derivative, a mixture obtained by adding a chiral agent to a nematic liquid crystal compound or the like. The chiral agent is a compound including a group having an asymmetric carbon such as 2-methylbutyl group.

Further, respective display layers 31, 33 and 35 may be a polymer dispersed liquid crystal obtained by dispersing a polymer into a cholesteric liquid crystal, a polymer stabilized liquid crystal wherein a polymer is dispersed, dissolved or swelled to be exist in the cholesteric liquid crystal, or a liquid crystalline polymer having a so-called mesogen which induces a mesomorphism to the main chain or side chain of the polymer.

An orientation layer may be disposed so as to be in contact with respective display layers 31, 33 and 35 for controlling the orientation state of the cholesteric liquid crystal.

A color filter 43, which transmits a red and absorbs a light of a color other than red, can be formed by a known method on the substrate 15 of the red cell 55 or the substrate 14 of the green cell 53, i.e., by applying or electrically depositing a dye or pigment on the substrate 15 or 14, or by dying a substrate material to be adhered onto the substrate 14 or 15.

Additionally, instead of providing the color filter 43 as the individual layer separating from the cell, the member composing the cell such as the substrate 15 of the red cell 55, the electrode 25 thereof, the orientation film thereof between the electrode 25 and the display layer 35, or the substrate 14 of the green cell 53, the electrode 24 thereof or the orientation film thereof between the electrode 24 and the display layer 33 may serve also as the color filter.

It is necessary that the member disposed between the adjacent display layers such as the substrate, electrode or orientation film does not disturb the state of the polarized light. Therefore, the retardation of these members is desirably close to zero.

In this case, the helix sense is different between the cholesteric liquid crystal of the blue display layer 31 and that of the green display layer 33 as well as between the cholesteric liquid crystal of the green display layer 33 and that of the red display layer 35, whereby the reflectance increases in the wavelength band where the reflective spectrum of blue and that of green are overlapped or the wavelength band where the reflective spectrum of green and that of red are overlapped. As a result, chroma or brightness is enhanced upon displaying cyan, yellow or white, while unnecessary short wavelength component reflected from the red display layer 35 is cut by the color filter 43, to thereby enhance the chroma of red and magenta.

Moreover, the number of the cholesteric liquid crystal display layer is the minimum, whereby a parallax is decreased as well as a cost of the apparatus can be reduced. Further, a driving voltage is individually applied for every display layer, thereby being capable of lowering the driving voltage.

<Second Case (in the Case of Four Layers)>

Figure 2:
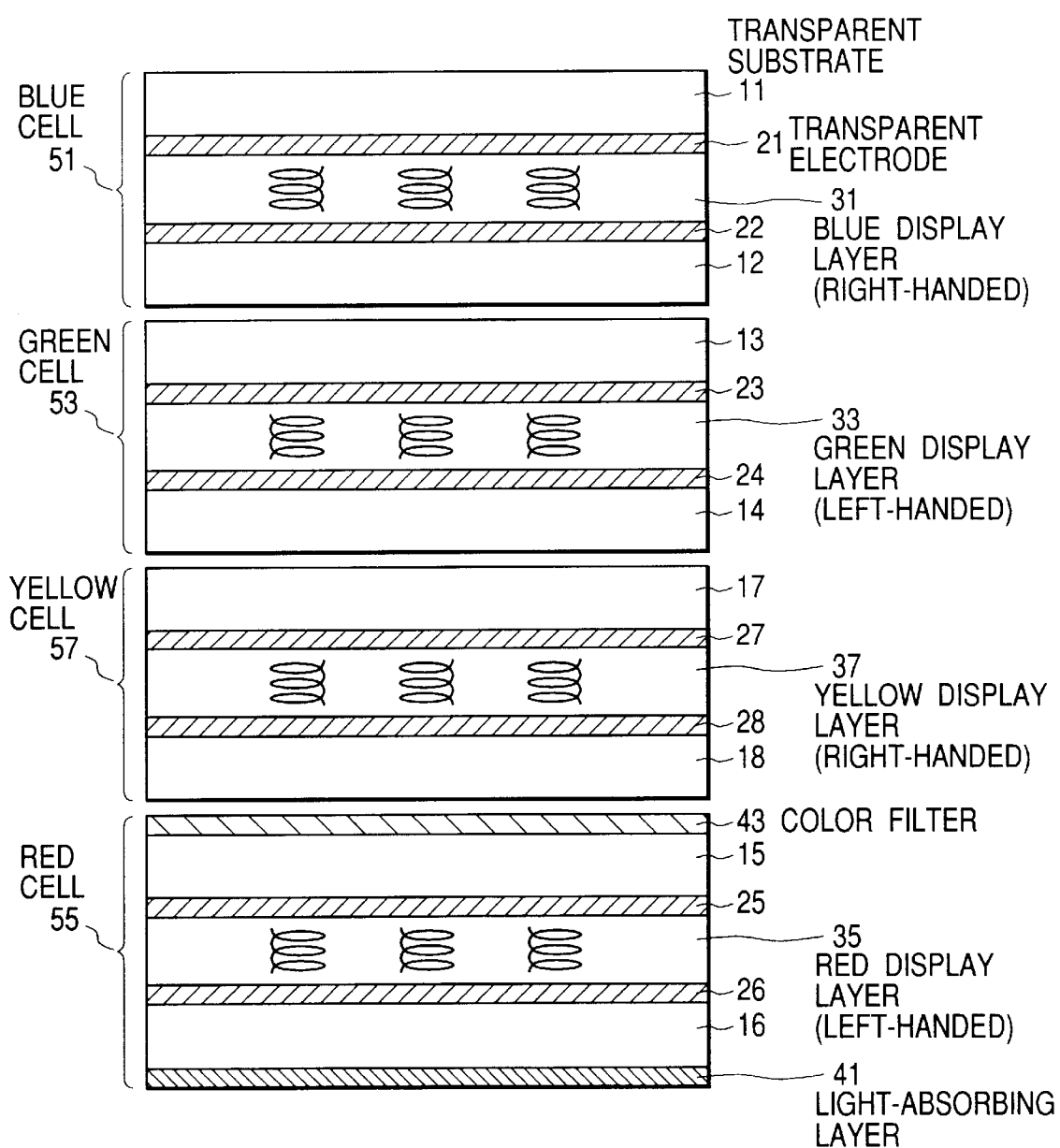
FIG. 2 is a view showing one example of a multi-color display device of the present invention.

FIG. 2 shows a second case of the first embodiment.

In this case, the blue cell 51, the green cell 53, a yellow cell 57 and the red cell 55 are laminated in this order from the side for observation. The color filter 43 is provided between the yellow cell 57 and the red cell 55. Mounted at the back side of the red cell 55 is the light-absorbing layer 41. The display layer 31 of the blue cell 51 contains a cholesteric right-handed liquid crystal, the display layer 33 of the green cell 53 contains a cholesteric left-handed liquid crystal, a display layer 37 of the yellow cell 57 contains a cholesteric right-handed liquid crystal and the display layer 35 of the red cell 55 contains a cholesteric left-handed liquid crystal. The yellow cell 57 has also two transparent substrates 17 and 18 each provided with transparent electrodes 27 and 28, and a display layer 37 is mounted between the transparent substrates 17 and 18.

Since the yellow display layer 37 exists in this case, reflectance in the yellow wavelength band increases. Additionally, the helix sense is different between the blue display layer 31 and the green display layer 33, the green display layer 33 and the yellow display layer 37 and the yellow display layer 37 and the red display layer 35, to thereby increase the reflectance in the wavelength band where the reflective spectrum of blue and green are overlapped, where the reflective spectrum of green and yellow are overlapped and where the reflective spectrum of yellow and red are overlapped. Consequently, chroma or brightness is enhanced upon displaying cyan, yellow or white, especially upon displaying yellow and white. Further, unnecessary short wavelength component reflected from the red display layer 35 is cut by the color filter 43, to thereby enhance the chroma of red and magenta.

Further, the cholesteric liquid crystal display layer has four layers, so that the parallax is decreased as well as the cost of the apparatus can be reduced, compared with the conventional case in which the cholesteric liquid crystal display layer has six layers where the respective display layers of blue, green and red is formed by two cholesteric liquid crystal layers each having different helix sense. Further, a driving voltage is individually applied for every display layer, thereby being capable of lowering the driving voltage.

<Other Case of the First Embodiment>

The first embodiment is not limited to the cases shown in FIGS. 1 and 2. For example, the helix sense of the cholesteric liquid crystal of the green display layer is made different from that of the red display layer, and the color filter is provided between the green display layer and the red display layer. Then, the green cell and the red cell are laminated to form a multi-color display device displaying green, red and yellow which is a mixing color of both green and red.

In this case, the reflectance increases in the wavelength band where the reflective spectrum of green overlaps with that of red, so that the chroma or brightness is enhanced upon displaying yellow. Further, unnecessary short wavelength component reflected from the red display layer is cut by the color filter upon displaying red, to thereby enhance chroma of red.

Second Embodiment

An example of the invention is shown as the second embodiment of the present invention.

<First Case (in the Case of Three Layers)>

Figure 3:
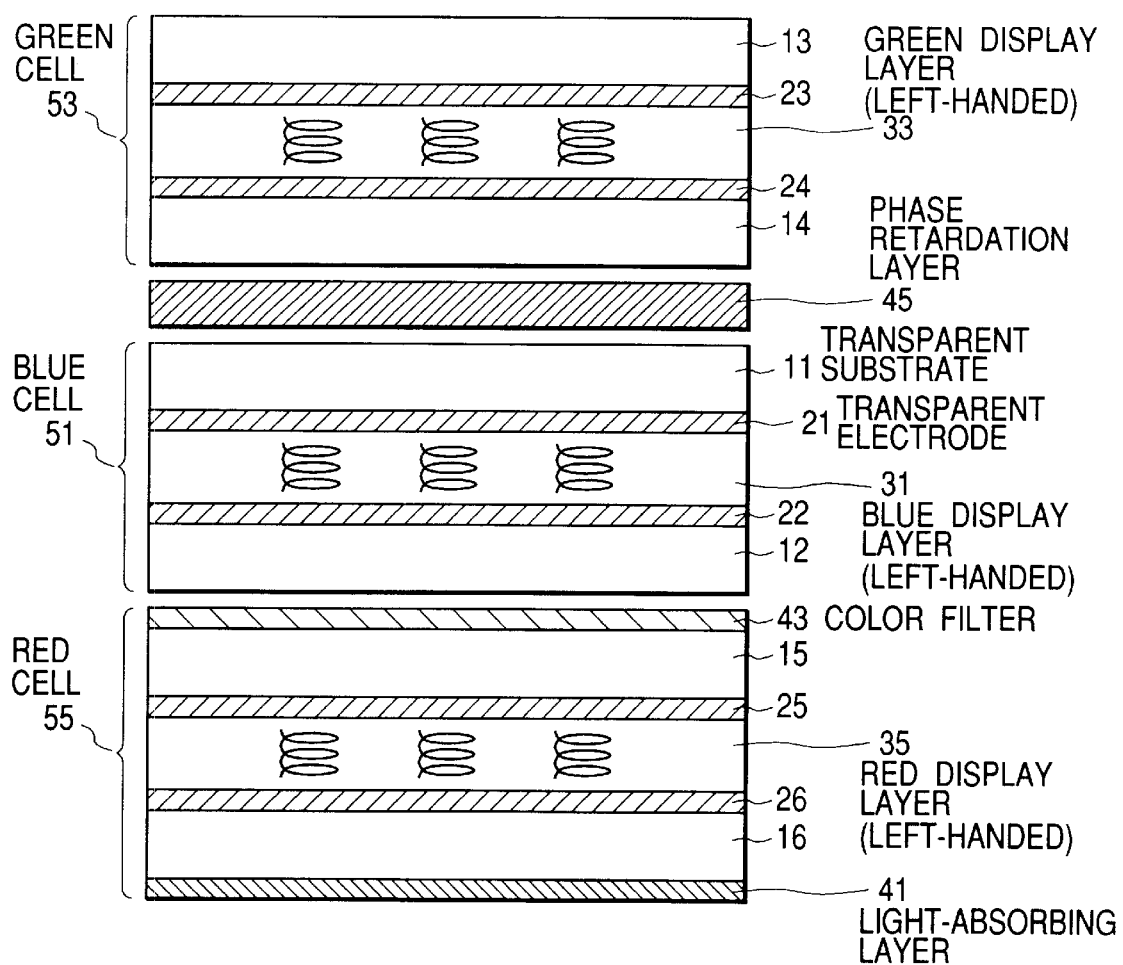
FIG. 3 is a view showing one example of a multi-color display device of the present invention.

FIG. 3 shows a first case of the second embodiment.

In this case, the green cell 53, the blue cell 51, and the red cell 55 are laminated in this order from the side for observation. A retardation layer 45 described later is provided between the green cell 53 and the blue cell 51, while the color filter 43 is provided between the blue cell 51 and the red cell 55. Mounted at the back side of the red cell 55 is the light-absorbing layer 41. The respective cholesteric liquid crystals of the display layer 33 of the green cell 53, the display layer 31 of the blue cell 51 and the display layer 35 of the red cell 55 are formed to have the same helix sense, i.e., left-handed direction.

The retardation layer 45, that changes the direction of a circularly polarized light in the reverse direction, uses a birefringent member called a ½ wave plate in which a phase difference between the ordinary light and extraordinary light becomes a ½ wavelength. Usable birefringent members are birefringent crystal such as a mica or rock crystal, or a polymer film in which a polymer such as polyester, polyvinyl alcohol, polycarbonate, polyethersulfone or the like is drawn to form a molecular orientation.

Additionally, instead of providing the retardation layer 45 as the individual layer separating from the cell, the member composing the cell such as the substrate 14 of the green cell 53, the electrode 24 thereof, the orientation film thereof between the electrode 24 and the display layer 33, or the substrate 11 of the blue cell 51, the electrode 21 thereof or the orientation film thereof between the electrode 21 and the display layer 31 may be a birefringent member for serving also as the retardation layer.

In this case, the same effect can be obtained as that obtained in the case shown in FIG. 1 where the helix sense of the cholesteric liquid crystal of the green display layer 33 is different from those of the cholesteric liquid crystals of the blue display layer 31 and the red display layer 35.

<Second Case (in the Case of Four Layers)>

Figure 4:
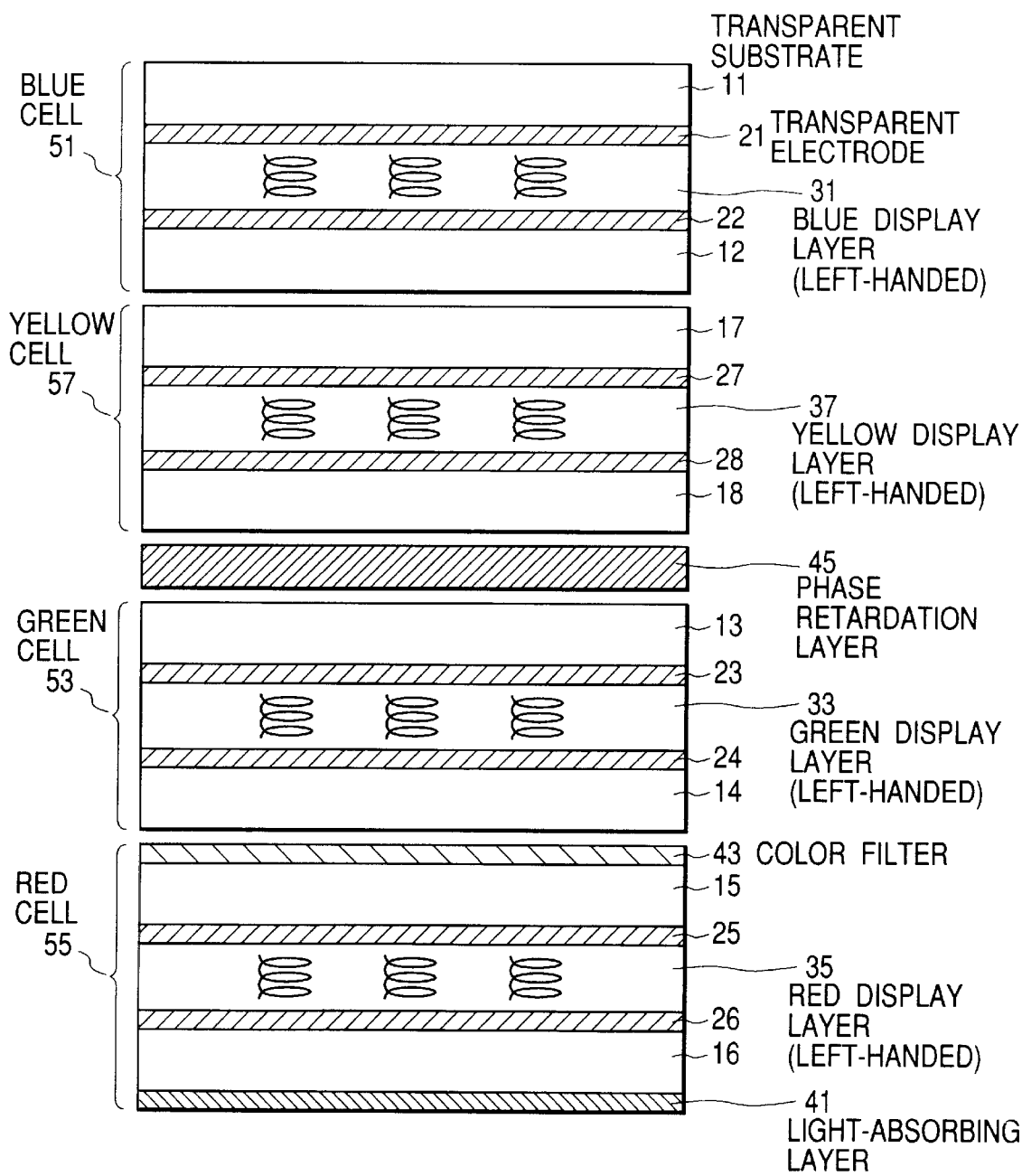
FIG. 4 is a view showing one example of a multi-color display device of the present invention.

FIG. 4 shows a second case of the second embodiment.

In this case, the blue cell 51, the yellow cell 57, the green cell 53 and the red cell 55 are laminated in this order from the side for observation. The retardation layer 45 is provided between the yellow cell 57 and the green cell 53, while the color filter 43 is provided between the green cell 53 and the red cell 55. Mounted at the back side of the red cell 55 is the light-absorbing layer 41. The respective cholesteric liquid crystals of the display layer 31 of the blue cell 51, the display layer 33 of the green cell 53 and the display layer 35 of the red cell 55 are formed to have the same helix sense, i.e., left-handed direction.

In this case, the same effect can be obtained as that obtained in the case shown in FIG. 2 where the helix senses of the cholesteric liquid crystals of the blue display layer 31 and the yellow display layer 37 are different from those of the cholesteric liquid crystals of the green display layer 31 and the red display layer 35.

<Other Case of the Second Embodiment>

The second embodiment is not limited to the cases shown in FIGS. 3 and 4. For example, the helix sense of the cholesteric liquid crystal of the green display layer coincides with that of the red display layer, and the retardation layer and color filter are provided between the green display layer and the red display layer. Then, the green cell and the red cell are laminated to form a multi-color display device displaying green, red and yellow which is a mixing color of both green and red.

In this case, the same effect can be obtained as that obtained by the other case of the first embodiment.

Third Embodiment

Figure 5:
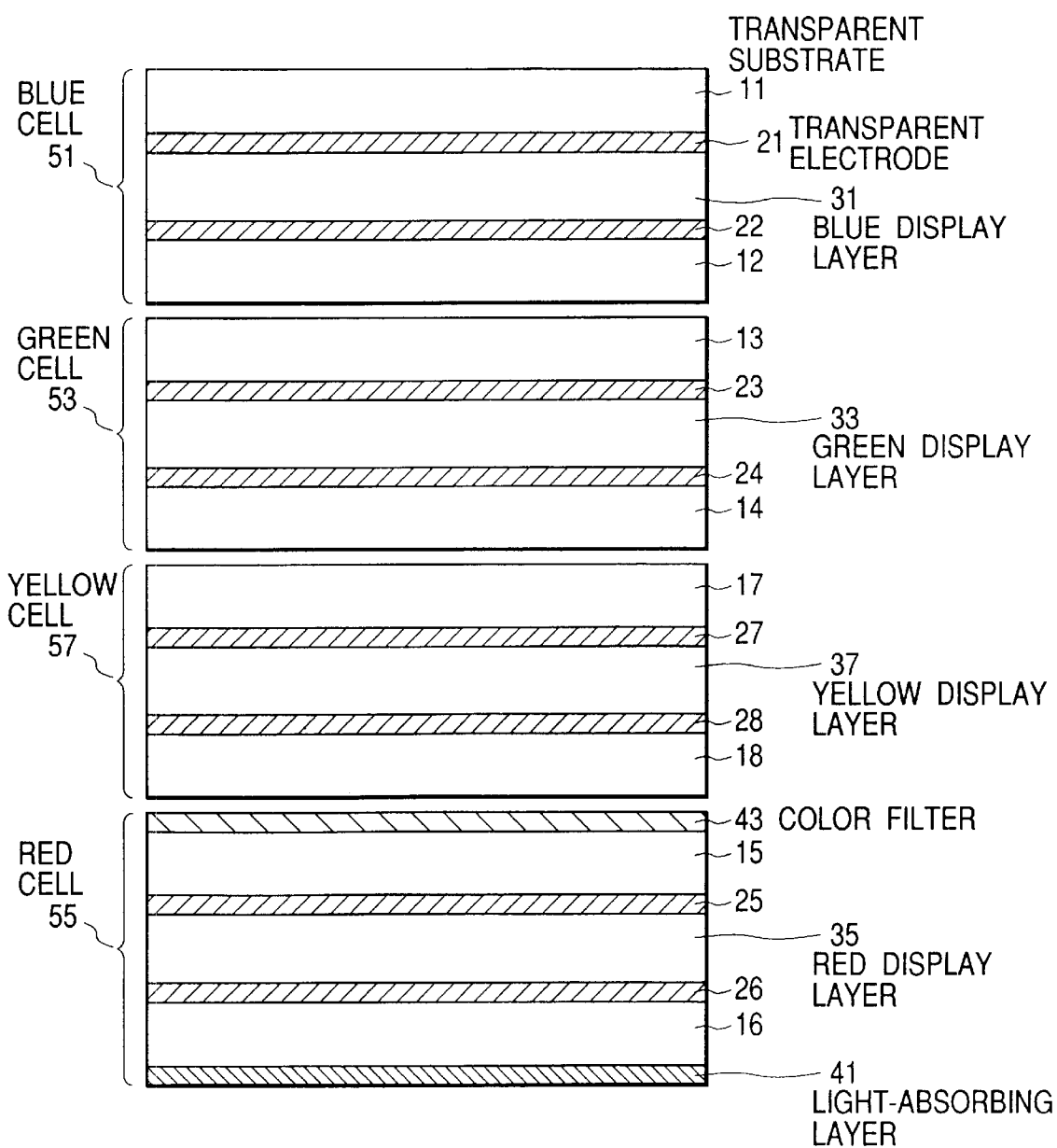
FIG. 5 is a view showing one example of a multi-color display device of the present invention.

FIG. 5 shows the third embodiment of the present invention.

In this case, the blue cell 51, the green cell 53, the yellow cell 57, and the red cell 55 are laminated in this order from the side for observation by the same manner as the case of FIG. 2. The color filter 43 is provided between the yellow cell 57 and the red cell 55, while the light-absorbing layer 41 is mounted at the back side of the red cell 55.

The respective display layers, i.e., the blue display layer 31, green display layer 33, yellow display layer 37 and red display layer 35, may be those that can be switched between the condition for each reflecting blue, green, yellow or red and the achromatic condition. For example, a polymer dispersed liquid crystal made by a holographically induced phase separation can be utilized. Further, it is possible that each of the display layers 31, 33, 37 and 35 are made to have a cholesteric liquid crystal each selecting and reflecting blue, green, yellow and red as well as each having the same helix sense, i.e., left-handed direction. The form birefringence of each substrate 12, 13, 14, 17, 18 and 15 is not necessarily zero.

In this case, the yellow display layer 37 exists, whereby the reflectance increases in the wavelength band of yellow. Therefore, chroma or brightness is enhanced upon displaying yellow or white, while unnecessary short wavelength component reflected from the red display layer 35 is cut by the color filter 43 upon displaying red or magenta, to thereby enhance the chroma of red or magenta.

Further, there are four display layers, so that the parallax is decreased as well as the cost of the apparatus can be reduced like the cases of FIG. 2 and FIG. 4. Further, a driving voltage is individually applied for every display layer, thereby being capable of lowering the driving voltage.

EXAMPLE

A multi-color display device of this invention is actually manufactured and its display characteristics are measured as described later.

A mixing chiral agent obtained by mixing a chiral additive S-811 and S-1011, both manufactured by Merck Japan Ltd., in the weight proportion of 4:1 was added to a nematic liquid crystal E44 manufactured by Merck Japan Ltd. in 22.7 wt.%, 19.4 wt.%, 18.2 wt.% and 16.2 wt% respectively to adjust each of left-handed cholesteric liquid crystals of blue, green, yellow and red. Similarly, each of right-handed cholesteric liquid crystals of blue, green, yellow and red was adjusted by using a mixing chiral agent obtained by mixing a chiral additive R-811 and R-1011, both manufactured by Merck Japan Ltd. in the weight proportion of 4:1. Approximately same selective reflection spectrum was obtained with respect to the right-handed and left-handed cholesteric liquid crystals in which each of the density of the chiral agent was equivalent to each other.

Figure 6:
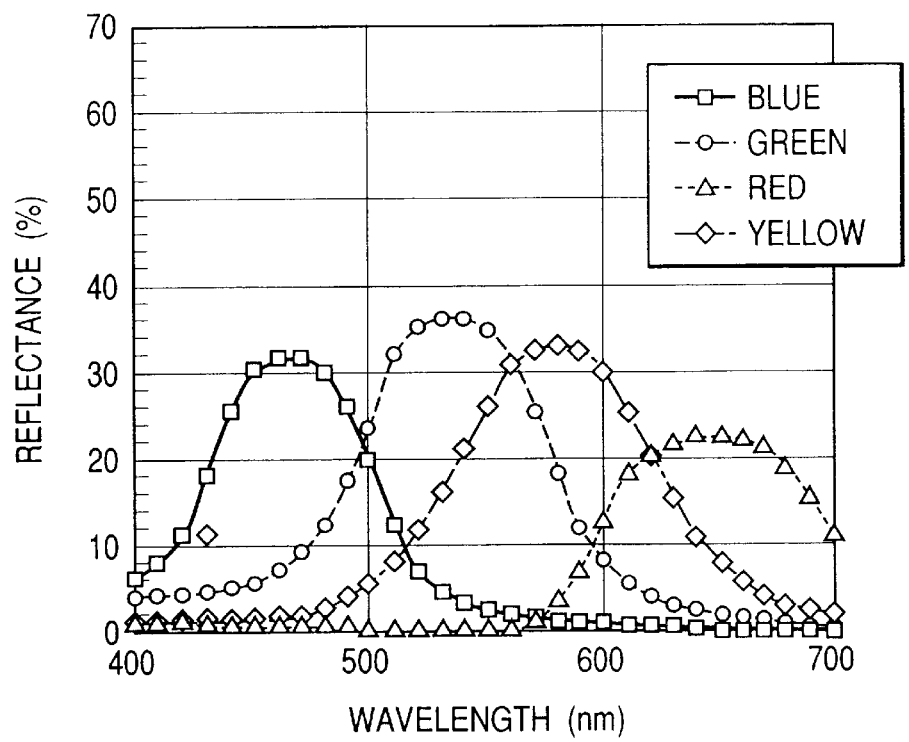
FIG. 6 is a view showing a reflective spectrum of a cholesteric liquid crystal of each color used in the Example.

FIG. 6 shows a reflective spectrum of the adjusted blue, green, yellow and red cholesteric liquid crystals.

Subsequently, two glass substrates each provided with ITO (Indium Tin Oxide) transparent electrode and each having a thickness of 150 microns were adhered with each other having a space of 5 micron therebetween for forming a cell. The above-mentioned respective cholesteric liquid crystals were injected to form eight kinds in total of the cholesteric liquid crystal cells, i.e., right-handed blue, green, yellow and red cholesteric liquid crystal cells and left-handed blue, green, yellow and red cholesteric liquid crystal cells.

A red paint was applied on the surface of the red cholesteric liquid crystal cell for forming a red color filter. Used as the red paint was the one obtained by dissolving 0.5 wt.% of a red dye PCred3P (manufactured by Nippon Kayaku Co., Ltd.) in 10 wt.% of a polyvinyl alcohol solution.

Figure 7:
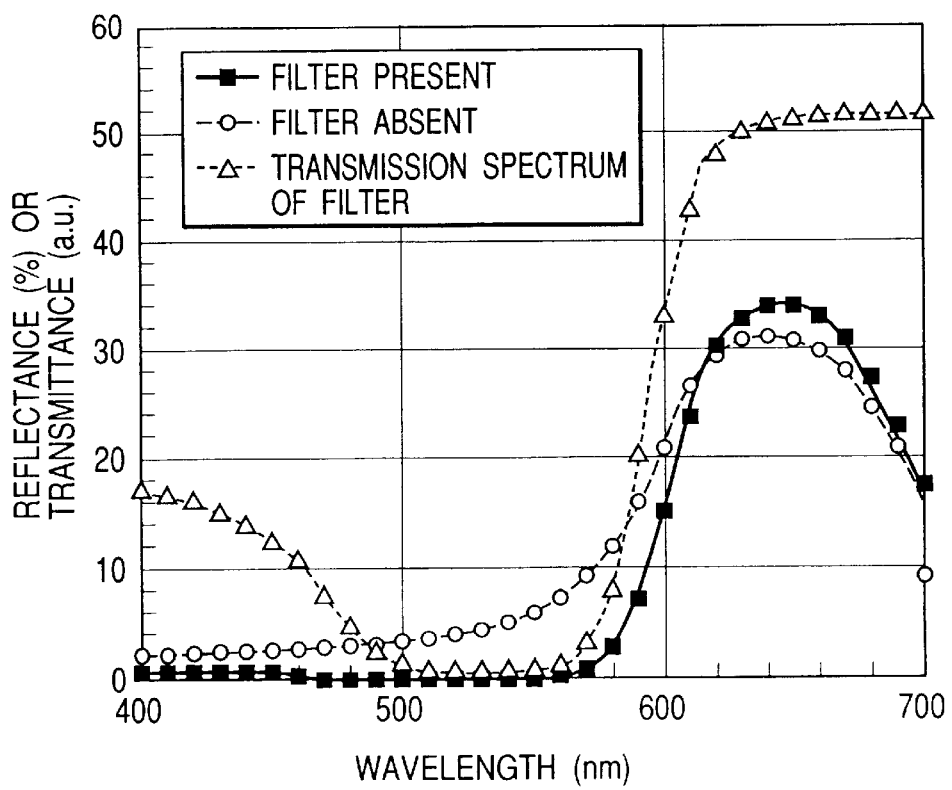
FIG. 7 is a view showing a change in a transmitting spectrum of a color filter used in the Example and a change in a reflective spectrum of a red cholesteric liquid crystal cell depending upon the presence or absence of the color filter.

FIG. 7 shows a change in a transmitting spectrum of the red color filter and in the reflective spectrum of the red cholesteric liquid crystal cell depending upon the presence or absence of the red color filter. The used red dye slightly transmits the color light of 500 nm or below, so that this red dye appears a red tinged with magenta. The formed red color filter has a steep cut-off wavelength at 600 nm. Therefore, the foot of the reflective spectrum of the red cholesteric liquid crystal at the short wavelength is cut to thereby enhance chroma. When the chroma $c^*(=\sqrt{(a^{*2}+b^{*2})}$ at the chromaticity coordinate of $L^*a^*b^*$ from the reflective spectrum measured by using a spectrophotometer CM2022 manufactured by Minolta Co., Ltd., the value of $c^*$ was 56.3 in the case where the red color filter was absent while the value of $c^*$ was improved to 74.1 by providing the red color filter. The red cholesteric liquid crystal cell provided with the red color filter was used in the following Example as long as a special notice was not given.

Example 1

(Case of FIG. 2)

Among the eight kinds of cholesteric liquid crystal cells, the red left-handed cell, yellow right-handed cell, green left-handed cell and blue right-handed cell were selected, and these selected cells were adhered with one another in this order from the bottom via an ultraviolet curing resin. The surface of the red cholesteric liquid crystal cell having thereon the red color filter was adhered onto the yellow cholesteric liquid crystal cell. Finally, a black paint was applied on the bottom surface of the red cholesteric liquid crystal cell to form a light absorbing layer, whereby the multi-color display device shown in FIG. 2 was manufactured.

The cell of each color could be rendered into a reflective state by applying a rectangular wave of 100 Hz and 50 V in 200 ms between two electrodes, as well as into an achromatic state by applying a rectangular wave of 25 V in 200 ms. The displays of red, green, blue, cyan, magenta, yellow, white and black can be obtained by a combination of the voltage applied to the cells of four colors. Specifically, each display of red, green and blue could be obtained by bringing one of the red, green and blue cells into a reflective state as well as bringing the other two cells and yellow cell into an achromatic state. Further, each display of magenta, cyan and yellow was obtained by bringing red and blue cells, blue and green cells, and green, yellow and red cells respectively into a reflective state as well as bringing the other cells into an achromatic state. Moreover, the display of white was obtained by bringing all of the cells into a reflective state, while the display of black was obtained by bringing all of the cells into an achromatic state.

Example 2

(Case of FIG. 5)

Among the eight kinds of cholesteric liquid crystal cells, the red left-handed cell, yellow left-handed cell, green left-handed cell and blue left-handed cell were selected, and these selected cells were adhered with one another in this order from the bottom via an ultraviolet curing resin. The surface of the red cholesteric liquid crystal cell having thereon the red color filter was adhered onto the yellow cholesteric liquid crystal cell. Finally, a black paint was applied on the bottom surface of the red cholesteric liquid crystal cell to form a light absorbing layer, whereby the multi-color display device shown in FIG. 5 was manufactured. All of the cholesteric liquid cells had the same helix senses, which was different from the Example 1.

Example 3

(Case of FIG. 4)

Among the eight kinds of cholesteric liquid crystal cells, the red left-handed cell, green left-handed cell, yellow left-handed cell, and blue left-handed cell were selected. Firstly, the green cholesteric liquid crystal cell was adhered onto the surface of the red cholesteric liquid crystal cell having thereon the red color filter via an ultraviolet curing resin. Subsequently, a ½ wave plate (retardation layer) containing a cellulose film having a phase difference of 285 nm was attached on the green cholesteric liquid crystal cell. Next, the yellow and blue cholesteric liquid crystal cells were adhered onto the ½ wave plate in this order via an ultraviolet curing resin. Finally, a black paint was applied on the bottom surface of the red cholesteric liquid crystal cell to form a light-absorbing layer, whereby the multi-color display device shown in FIG. 4 was manufactured. The different points from the Example 2 were that the laminating order of the yellow and green cholesteric liquid crystal cells were switched and the ½ wave plate was inserted therebetween.

Example 4

(Case of FIG. 1)

Among the eight kinds of cholesteric liquid crystal cells, the red left-handed cell, green right-handed cell and blue left-handed cell were selected, and these selected cells were adhered with one another in this order from the bottom via an ultraviolet curing resin. The surface of the red cholesteric liquid crystal cell having thereon the red color filter was adhered onto the green cholesteric liquid crystal cell. Finally, a black paint was applied on the bottom surface of the red cholesteric liquid crystal cell to form a light absorbing layer, whereby the multi-color display device shown in FIG. 1 was manufactured.

Compared Example

Figure 17:
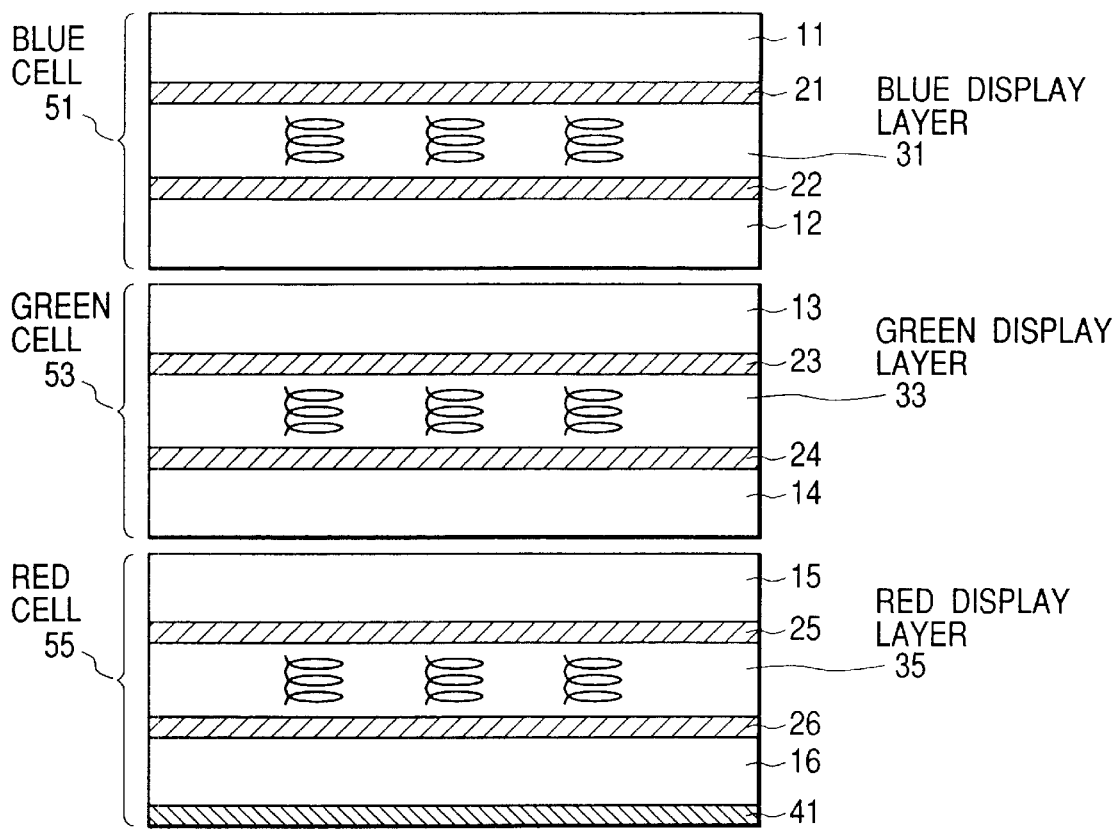
FIG. 17 is a view showing one example of a conventional multi-color cholesteric liquid crystal display device.
Figure 18:
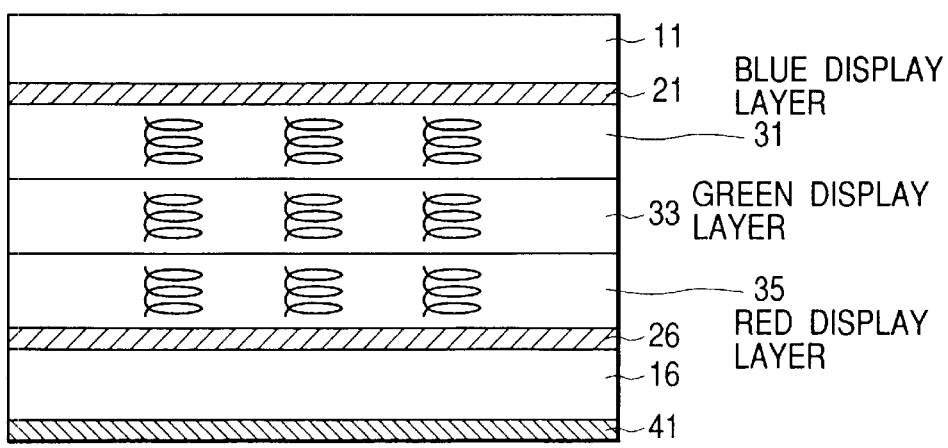
FIG. 18 is a view showing another example of a conventional multi-color cholesteric liquid crystal display device.

Among the eight kinds of cholesteric liquid crystal cells, the red left-handed cell, green left-handed cell and blue left-handed cell were selected, and these selected cells were adhered with one another in this order from the bottom via an ultraviolet curing resin for comparison. The surface of the red cholesteric liquid crystal cell having thereon the red color filter was adhered onto the green cholesteric liquid crystal cell. Finally, a black paint was applied on the bottom surface of the red cholesteric liquid crystal cell to form a light-absorbing layer, whereby a conventional multi-color display device shown in FIG. 17 was manufactured.

Measurement and Evaluation

The reflective spectra of Examples 1 to 4 and Compared Example were measured by using a spectrophotometer CM2022 manufactured by Minolta Co., Ltd. for evaluation of chroma or brightness upon displaying yellow and white which evaluation was conventionally a great subject.

Figure 8:
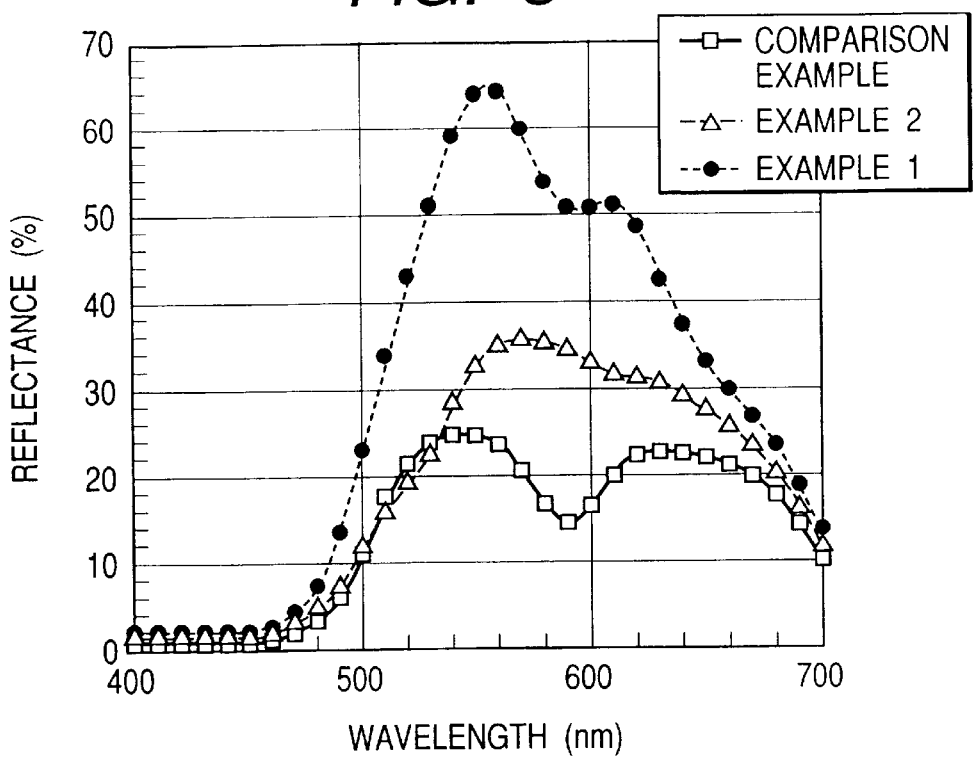
FIG. 8 is a view showing a reflective spectrum of the Examples 1 and 2 and Compared Example upon displaying yellow.
Figure 9:
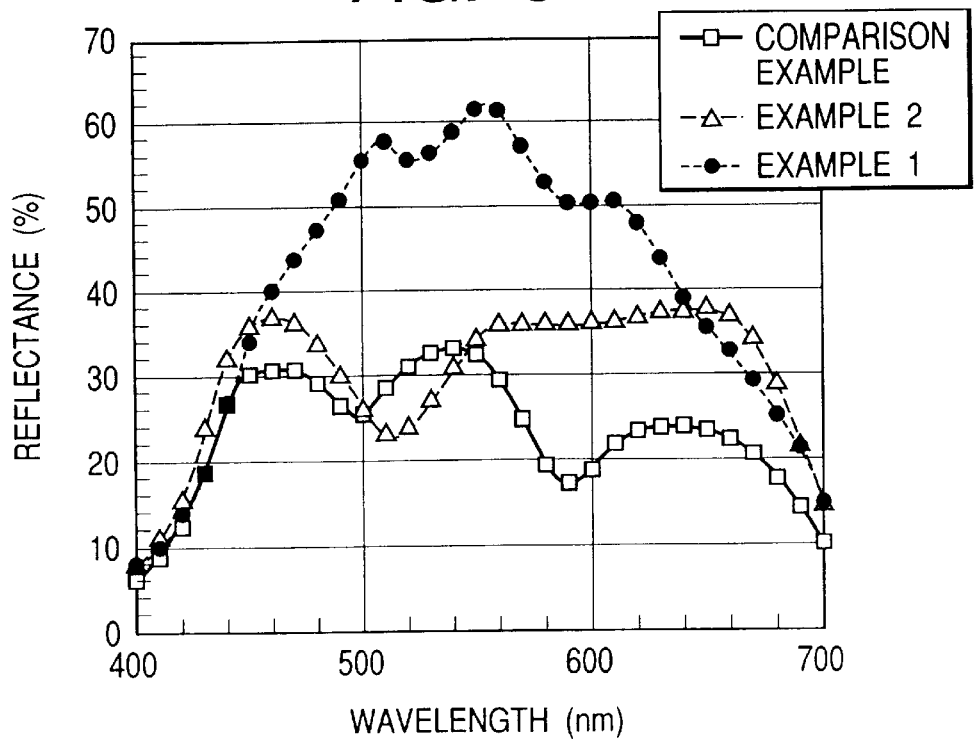
FIG. 9 is a view showing a reflective spectrum of the Examples 1 and 2 and Compared Example upon displaying white.

FIG. 8 and FIG. 9 show respectively the reflective spectra of Examples 1 and 2 and Compared Example upon displaying yellow and white respectively. The valley in the vicinity of 590 nm appeared in the reflective spectrum of the Compared Example was not observed in the Examples 1 and 2 in either case of displaying the yellow and white. It was confirmed that the reflective spectrum in this wave band increased in the Examples 1 and 2. In particular, the peak reflectance was remarkably improved in the Example 1 compared with the Compared Example and Example 2.

FIG. 14 shows the brightness upon displaying white and the brightness and chroma upon displaying yellow represented by the brightness L* and chroma c* $(=\sqrt{(a^{*2}+b^{*2})})$ at the chromaticity coordinates L*a*b* based upon the measured data. A great improvement was observed in the Example 1 compared with the Compared Example, i.e., the brightness of white increased by 20.5, the brightness of yellow increased 24.2 and the chroma of yellow increased by 22.8 compared with the Compared Example. The improvement was observed in the Example 2 compared with the Compared Example such that the brightness of white increased by 7.3, the brightness of yellow increased 9.7 and the chroma of yellow increased by 11.3 compared with the Compared Example.

Figure 10:
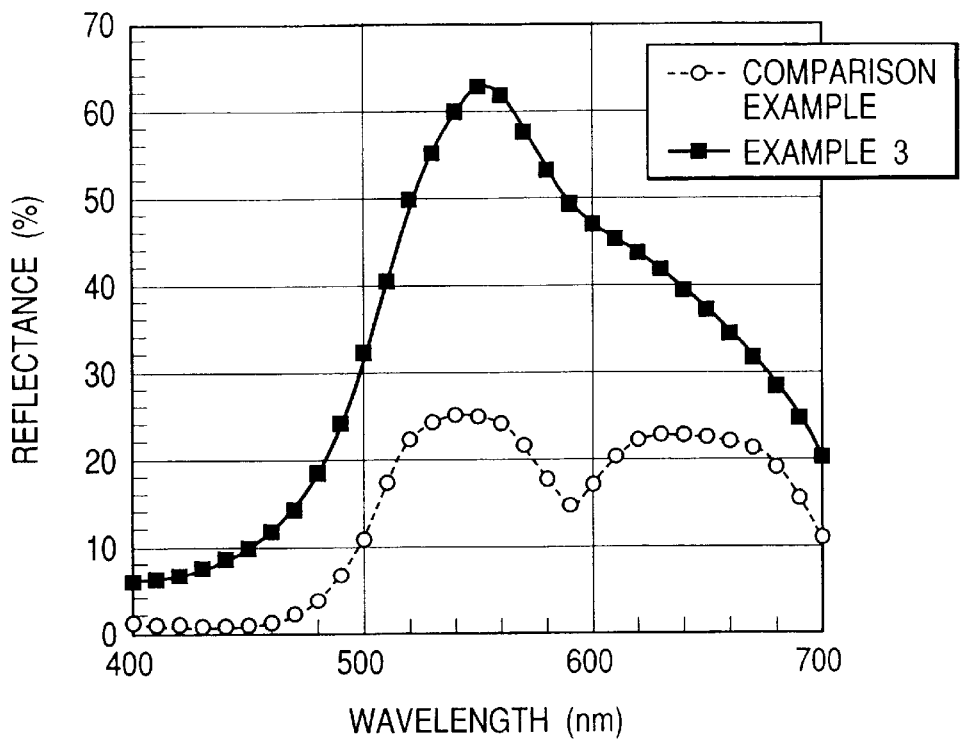
FIG. 10 is a view showing a reflective spectrum of the Examples 3 and Compared Example upon displaying yellow.
Figure 11:
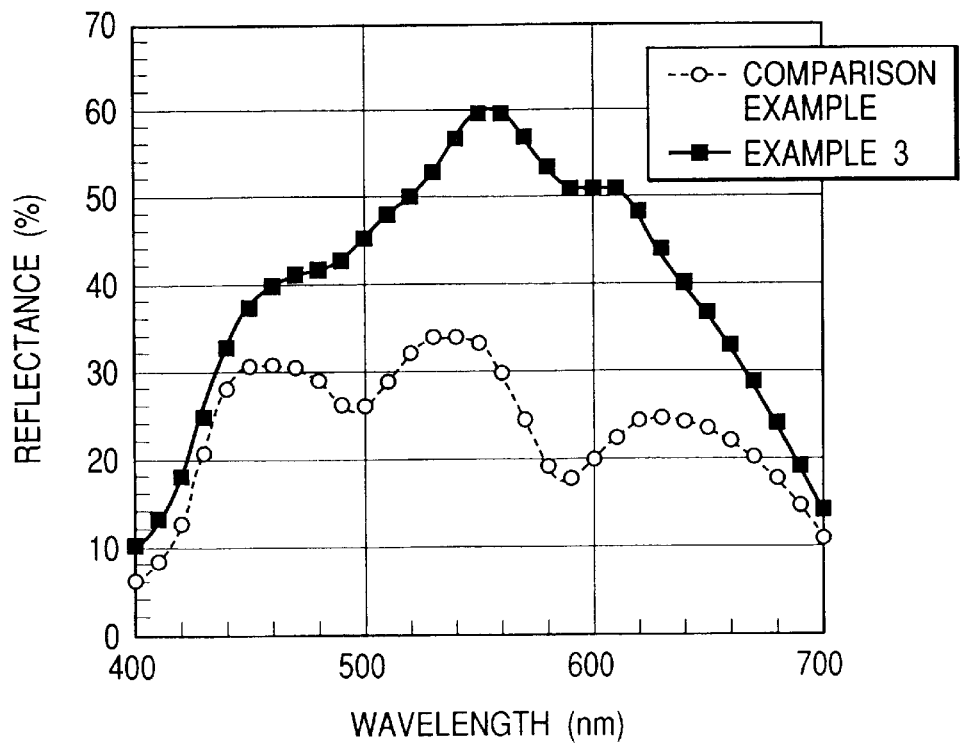
FIG. 11 is a view showing a reflective spectrum of the Examples 3 and Compared Example upon displaying white.

FIGS. 10 and 11 show respectively the reflective spectra of the Example 3 and the Compared Example in either case of displaying yellow and white. A remarkable increase at the peak reflectance was observed in the Example 3 compared with the Compared Example. In the Example 3, the helix senses of all the cholesteric liquid cells were the same, but the red and green cholesteric liquid crystal cells were disposed at one side of the ½ wave plate (retardation layer) and the yellow and blue cholesteric liquid crystal cells were disposed at the other side thereof. Therefore, the same effect was confirmed to be obtained as the Example 1 in which the helix senses of the red and green cholesteric liquid crystal cells were different from those of the yellow and blue cholesteric liquid crystal cells.

As shown in FIG. 14, a great improvement was not observed in the chroma of yellow, but was observed in the brightness of white by 19.3 and brightness of yellow by 23.7 in the Example 3 compared with the Compared Example.

Figure 12:
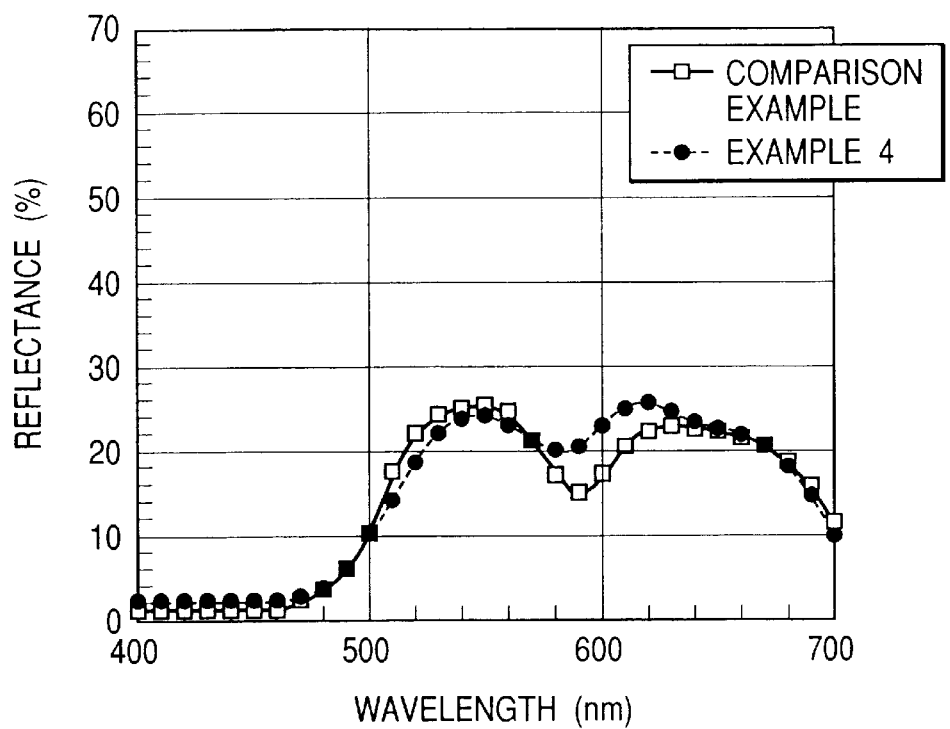
FIG. 12 is a view showing a reflective spectrum of the Examples 4 and Compared Example upon displaying yellow.
Figure 13:
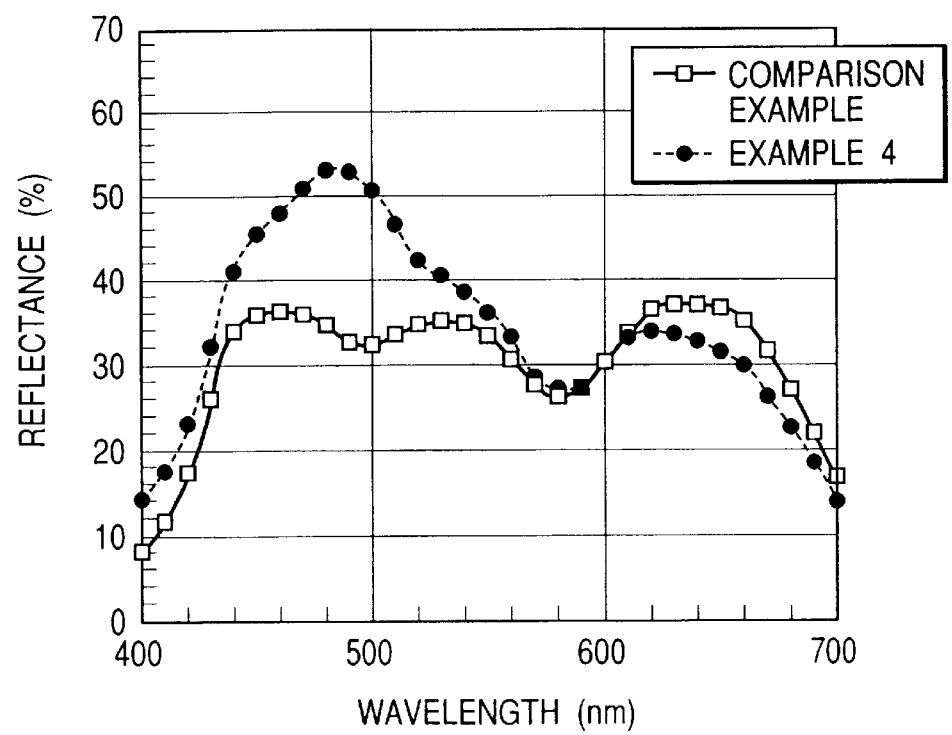
FIG. 13 is a view showing a reflective spectrum of the Examples 4 and Compared Example upon displaying white.

FIGS. 12 and 13 show respectively the reflective spectra of the Example 4 and the Compared Example in either case of displaying yellow and white. It was confirmed that, upon displaying white in the Example 4, the reflectance increased at the band in the vicinity of 480 nm where the reflective spectra of blue and green were overlapped with each other. Accordingly, the reflectance is expected to increase upon displaying cyan that is a mixing color of blue and green. However, the increase of the reflectance was not observed in either case of displaying yellow and white, compared with the Compared Example, at the band in the vicinity of 580 nm where the reflective spectra of green and red were overlapped with each other.

As shown in FIG. 14, a great improvement was not observed in the chroma or brightness of yellow, but a slight improvement was observed in the brightness of white in the Example 4 compared with the Compared Example.

Other Embodiment

The above-mentioned example is the case for firstly forming a cell between a pair of substrates each provided with an electrode and for secondly adhering the cell by the number of the display colors to obtain a multi-color display device. However, the manufacturing method of the multi-color display device is not limited thereto. Specifically, a various method can be adapted such as the method of repeating a process of applying the cholesteric liquid crystal on the substrate provided with the electrode, and then, of laminating thereon the other substrate provided with the other electrode, or a method in which multiple substrates each provided with an electrode are overlaid with one another having a predetermined space therebetween to form a multilayered empty cells, and then, a cholesteric liquid crystal is injected into each cell. Although the laminating order of the liquid crystal layer is arbitrary, it is desirable to laminate the layers in the order of blue, yellow, green and red from the side for observation. This is because achromatic white display can be obtained by adding the spectrum at the wave band of yellow to the bluish white by the reflection from the blue layer formed at the top side.

As for the method for switching each display layer between the reflective state and the achromatic state, all display layers may be laminated to be formed between a pair of electrodes and the difference with respect to these electrolytic response, i.e., the difference in the threshold electric field of the change in the orientation state, the difference in the positive or negative of the anisotropy of the permittivity or the like may be utilized for switching each display layer between the reflective state and the achromatic state, instead of forming each display layer between a pair of electrode respectively for applying individually a driving voltage thereto as shown in FIGS. 1 to 5.

Further, each display layer may be switched between the reflective state and the achromatic state in response to the external stimulus such as heat, magnetic force, light, stress or the like, not being limited to voltage or electric field.

As described above, the problem of lacking chroma and brightness attributed to a circular dichroism in the selective reflection of the cholesteric liquid crystal can be solved according to the present invention in the multi-color display device using a cholesteric liquid crystal by using less display layers in the state where the parallax is decreased as well as where the cost of the device is reduced, allowing to obtain a vivid, bright multi-color display device.

Further, according to the present invention, vivid and bright display can be obtained by using less display layers in the state where the parallax is decreased as well as where the cost of the device is reduced in not only the multi-color display device using a cholesteric liquid crystal but also a reflective-type multi-color display device.

What is claimed is:

1. A multi-color display device comprising a plurality of display layers laminated with one another, the display layers each comprising a single cholesteric liquid crystal layer and each having a different wave band of a selective reflection, wherein a helix sense of a cholesteric liquid crystal of at least one display layer is different from those of cholesteric liquid crystals of the other display layers.

2. The multi-color display device according to claim 1, wherein the plurality of display layers are three layers comprising each of cholesteric liquid crystal layers selecting and reflecting blue, green and red respectively.

3. The multi-color display device according to claim 2, wherein the helix sense of the cholesteric liquid crystal of the green display layer is different from the helix senses of the cholesteric liquid crystals of the blue and red display layers.

4. The multi-color display device according to claim 1, wherein the plurality of display layers are four layers comprising each of cholesteric liquid crystal layers selecting and reflecting blue, green, yellow and red respectively.

5. The multi-color display device according to claim 4, wherein the helix senses of the cholesteric liquid crystals of the blue and yellow are the same while they are different from the helix senses of the cholesteric liquid crystals of the green and red display layers.

6. A multi-color display device comprising a plurality of display layers laminated with one another, the display layers each comprising a single cholesteric liquid crystal layer and each having a different wave band of a selective reflection, wherein the helix senses of the cholesteric liquid crystals of all the display layers are the same, and a retardation layer for changing reversely a circular deviation is provided between one display layer and the other display layer adjacent to the one layer.

7. The multi-color display device according to claim 6, wherein the plurality of display layers are three display layers comprising a first display layer comprising a cholesteric liquid crystal which selects and reflects green and a second and third display layers comprising cholesteric liquid crystals each selecting and reflecting blue and red or red and blue, and wherein the retardation layer is provided between the first display layer and the second display layer.

8. The multi-color display device according to claim 6, wherein the plurality of display layers are four display layers comprising a first and second display layers comprising cholesteric liquid crystals each selecting and reflecting blue and yellow or yellow and blue and a third and fourth display layers comprising cholesteric liquid crystals each selecting and reflecting green and red or red and green, and wherein the retardation layer is provided between the second display layer and the third display layer.

9. A multi-color display device comprising a plurality of display layers laminated with one another, the display layers each comprising a single cholesteric liquid crystal layer and each having a different wave band of a selective reflection, wherein:

a helix sense of a cholesteric liquid crystal of at least one display layer is different from those of cholesteric liquid crystals of the other display layers; or each of the display layers has a cholesteric liquid crystal, each of the cholesteric liquid crystal having a same helix sense, and a retardation layer for changing reversely a circular deviation is provided between one display layer and another display layer adjacent to the one layer.

10. A multi-color display device comprising a plurality of cholesteric liquid crystal layer laminated with each other and each having a different wave band of a selective reflection, wherein a helix sense of a cholesteric liquid crystal of at least one cholesteric liquid crystal layer is different from those of cholesteric liquid crystals of the other cholesteric liquid crystal layers.

* * * * *